Dec. 16, 1930.  C. S. CRICKMER  1,785,111
HANDLE
Filed April 19, 1928
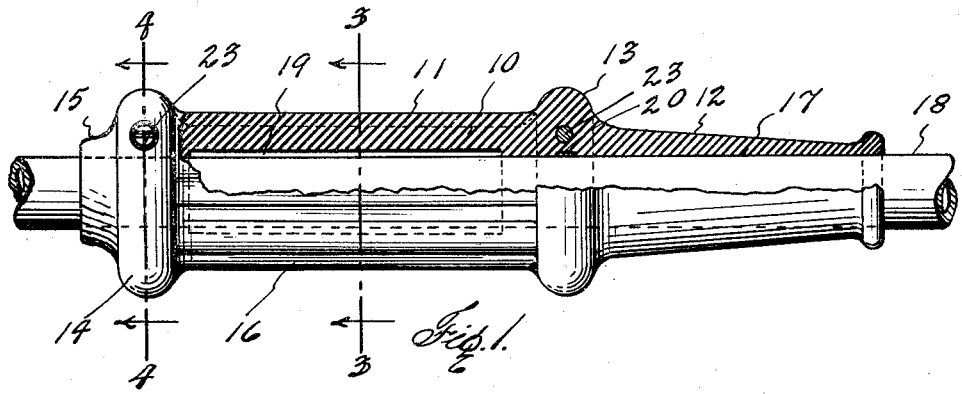
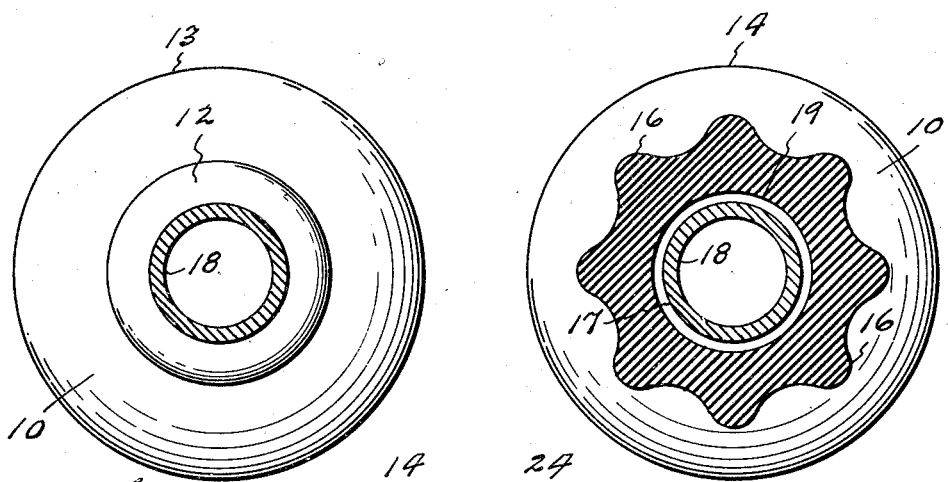
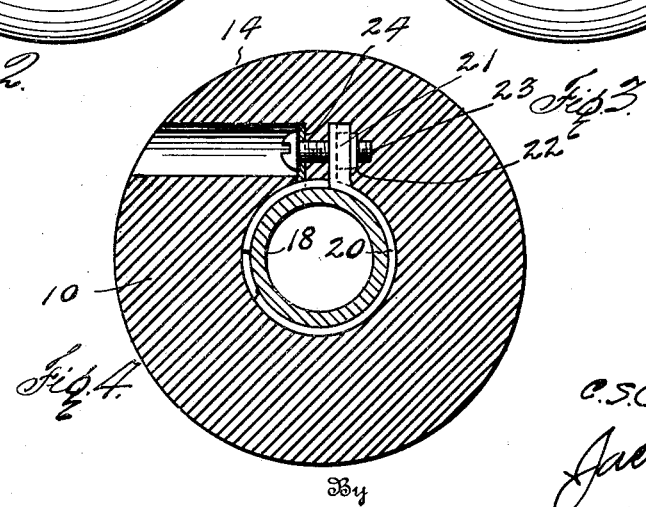
Inventor
C. S. Crickmer
By Jack A. Schly
Attorney Patented Dec. 16, 1930

1,785,111

UNITED STATES PATENT OFFICE

CHARLES S. CRICKMER, OF DALLAS, TEXAS, ASSIGNOR TO TRIDEX CORPORATION, OF DALLAS, TEXAS, A CORPORATION OF TEXAS

HANDLE

Application filed April 19, 1928. Serial No. 271,156.

This invention relates to new and useful improvements in handles.

One object of the invention is to provide a handle for tubular conductors which will possess a comfortable and convenient hand hold and which will be free from exterior fastenings.

A particular object of the invention is to provide a handle of flexible material and especially designed for use on tubular conductors carrying hot fluids, whereby the hand of the operator will be protected from the heat and he will be assured a firm grip.

Another object of the invention is to provide a flexible handle having clamps embedded therein, whereby the handle may be fastened on the tubular conductor.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a view partly in elevation and partly in section, showing a handle constructed in accordance with my invention, Fig. 2 is an enlarged end elevation of the handle, Fig. 3 is an enlarged transverse sectional view taken on the line 3—3 of Fig. 1, and Fig. 4 is an enlarged transverse sectional view taken on the line 4—4 of Fig. 1.

In the drawings the numeral 10 designates an elongated tubular body or sleeve preferably formed of flexible material capable of resisting and defeating the transmission of heat, however, the body need not be flexible. Highly satisfactory results have been obtained from a body made of a composition including rubber and asbestos. Such a handle while flexible may be firmly gripped and is heat-resisting, but it is to be understood that the invention is not to be limited to any particular materials.

The body 10 has a hand grip 11 separated from an elongated tapered nipple 12 by an annular collar or bead 13. A second annular collar 14 is formed at the opposite end of the grip and has an annular lip 15. The grip is formed with longitudinal ribs or flutes 16 extending from one collar to the other collar.

The collars extend radially so as to form guards at each end of the hand grip to prevent the handle slipping through the hand of the operator. The body has an axial bore 17 of such diameter as to snugly receive the tube 18, the diameter changing with the size of tube to be used.

Within the length of the grip 11 a cylindrical cavity or chamber 19 is counterbored in the bore 18. This chamber being closed when the handle is fastened on the tube, acts as a nonconductor of heat and helps to keep the grip 11 cool, when steam or hot fluids are passing through the tube. The flutes 16 afford a better hand hold and also provide ventilating channels, permitting a circulation of air when the grip is held in the hand of the operator.

For fastening the handle on the tube 18, which may be a hose, pipe or the like, each collar has a split metallic clamp 20 embedded therein. These clamps may be of any suitable form capable of gripping the tube. Each clamp has a lug 21 with a nut 22 confined therein for receiving a screw bolt 23. The head of the bolt is confined in an ear 24 of the clamp opposite the lug.

Each collar has a well or cavity 25 extending inwardly to the ear 24 of the contained clamp, whereby the head of the bolt is exposed so as to be turned by a screwdriver. By this arrangement the handle may be fastened against movement on the tube. The collar 14 is at the forward end of the handle and when the grip 11 is held in the hand of the operator, the nipple 12 will protect his wrist and coat sleeve from contact with the tube 18. The nipple also protects a rubber hose from sharp bends and kinks when the device is used thereon.

Various changes in the size and shape of the different parts, as well as modifications and alterations, may be made within the scope of the appended claims.

What I claim, is:

1. In a handle for tubular conductors, an elongated tubular body having a surrounding hand grip and radially extending collars at each end, and clamps embedded in the body for engaging a tubular conductor.

2. In a handle for tubular conductors, an elongated body having an external hand grip and a longitudinal bore, and clamps embedded in the body and surrounding the bore.

3. A flexible handle including an elongated body having a longitudinal bore, and adjustable clamps embedded in the body and surrounding the bore, the body having transverse openings in its side exposing the adjusting means of said clamps.

4. A flexible handle including an elongated body having a longitudinal bore and a longitudinal cavity contiguous to said bore terminating short of the ends of the bore, said body having a longitudinal surrounding hand grip extending substantially the length of the cavity, and collars at each end of the hand grip of the body.

5. A flexible handle including an elongated body having a longitudinal bore and a longitudinal cavity contiguous to said bore terminating short of the ends of the bore, said body having a longitudinal surrounding hand grip extending substantially the length of the cavity, collars at each end of the hand grip of the body, and metallic adjustable clamps embedded in the body and surrounding the bore at the collars.

In testimony whereof I affix my signature.

CHARLES S. CRICKMER.